United States Patent [19]

Tomita

[11] 3,858,006

[45] Dec. 31, 1974

[54] AUTOMATIC TELEPHONE ANSWERING APPARATUS

[75] Inventor: Tadashi Tomita, Tokyo, Japan

[73] Assignee: Pioneer Electronic Corporation, Tokyo, Japan

[22] Filed: Sept. 5, 1972

[21] Appl. No.: 286,239

[30] Foreign Application Priority Data

Sept. 4, 1971 Japan .............................. 46-68307

[52] U.S. Cl. ............................................... 179/6 E
[51] Int. Cl. ........................................... H04m 1/64
[58] Field of Search ............................ 179/6 E, 6 R

[56] References Cited

UNITED STATES PATENTS

| | | | |
|---|---|---|---|
| 3,310,629 | 3/1967 | Yamamoto | 179/6 E |
| 3,337,690 | 8/1967 | Martin | 179/6 E |
| 3,511,935 | 5/1970 | Mizuno | 179/6 E |
| 3,730,997 | 5/1973 | Konno | 179/6 E |

*Primary Examiner*—James W. Moffitt
*Assistant Examiner*—Alan Faber
*Attorney, Agent, or Firm*—Woodhams, Blanchard and Flynn

[57] ABSTRACT

An automatic telephone answering apparatus in which necessary messages to be conveyed to a specified caller may be previously recorded on the message sending tape, which is adapted to run, only when the signal detecting circuit detects a specific signal from said caller within the specified period, to send out the message for him, so that said specified caller can listen to the message left for him by telephoning to his home where no one is present or to his office after the closing hour, and a caller other than said specified caller receives only conventional automatic telephone answering due to the particular structure of the signal detecting circuit.

10 Claims, 3 Drawing Figures

AUTOMATIC TELEPHONE ANSWERING APPARATUS

FIELD OF THE INVENTION

The present invention relates to an automatic telephone answering apparatus and, more particularly to an automatic telephone answering apparatus through which a specified caller, for example an owner of the telephone receives messages left for him.

BACKGROUND OF THE INVENTION

In a conventional automatic telephone answering apparatus, when a call signal (bell signal) from a caller comes into the apparatus, a previously recorded answering message, for example, "There is no one in the office at the present time. Please leave your message." is sent out to the caller. Subsequently, a tone signal, such as a beep tone, is transmitted to immediately set the apparatus to record a message from the caller for a predetermined interval of time (for example, 30 seconds) and thereafter the apparatus is then restored to a standby state for a further message.

Thus, in the conventional apparatus as mentioned above, only one kind of message is sent out from the apparatus, so that the caller receives nothing more than the conventional message.

In view of the above, there has increased a demand for an automatic telephone answering apparatus through which it is possible for an owner of the telephone or any other specified person to receive messages left for him through any accessible or convenient telephone when he is out.

It is, therefore, a primary object of the present invention to provide an automatic telephone answering apparatus which is capable of not only performing ordinary automatic telephone answering for a general caller but is also capable of transmitting a message to a specified caller.

SUMMARY OF THE INVENTION

According to the present invention, there is provided an automatic telephone answering apparatus comprising:

starting circuit means adapted to start its operation by a call signal;

first timer circuit means adapted to be actuated through said starting circuit means and determine the whole operating time of the apparatus;

second timer circuit means adapted to operate after a short period of time from the actuation of said first timer circuit;

signal detecting circuit means adapted to operate when a specific signal is transmitted by a caller within a predetermined period after said first timer circuit has been operated and before the second timer circuit has started its operation, and message sending circuit means having a message sending tape for sending out the message to the specified caller only when the signal detecting circuit is operated.

The invention will be better understood from the following description taken in connection with the accompanying drawings, in which.

Figures 1, 2:
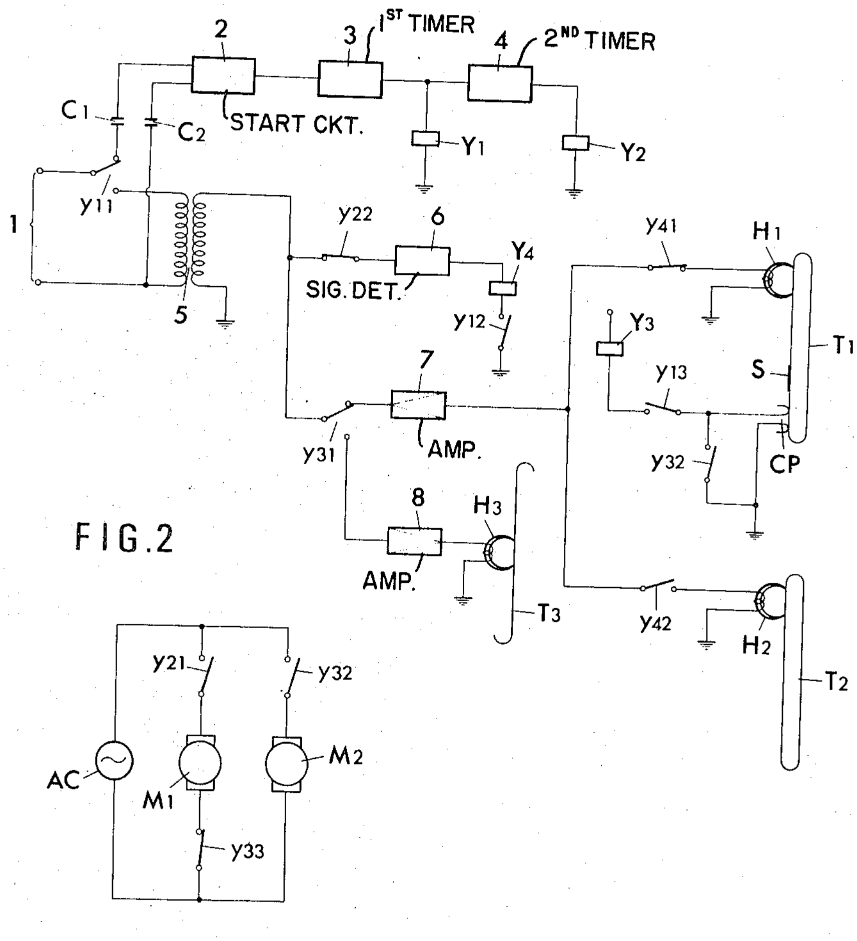
FIG. 1 is a circuit diagram of an automatic telephone answering apparatus in accordance with the present invention.
FIG. 2 is a circuit diagram of a driving circuit employed in the automatic telephone answering apparatus shown in FIG. 1.

Referring now to the drawings, there is illustrated one preferred embodiment of the present invention. Numeral 1 designates the input terminals for connection to a telephone line. Numeral 2 designates a starting circuit for rectifying and storing a current of a call signal coming to said terminals 1. The starting circuit 2 is connected in circuit with a first timer circuit 3 and activates same after a short period of time, for example 3 to 10 seconds. The first timer circuit 3 determines the whole operating period of the automatic telephone answering apparatus. A second timer circuit 4 is connected in circuit with the timer circuit 3 and becomes activated by the first timer circuit 3 a few seconds (for example, 2 or 3 seconds) later than the activation of the first timer circuit 3 and stops its operation when the output of the first timer circuit 3 has been extinguished. $Y_1$ is a relay having three contacts $y_{11}$, $y_{12}$ and $y_{13}$ which are adapted to operate by the output signal of said first timer circuit 3. $Y_2$ is a relay having two contacts $y_{21}$ and $y_{22}$ adapted to operate by the output signal of the second timer circuit 4. A matching transformer 5 is connected to the terminal 1 through the contact $y_{11}$ of the relay $y_1$. A signal detecting circuit 6 is connected to the secondary winding of the matching transformer 5 through the contact $y_{22}$ of the relay $y_2$. The signal detecting circuit 6 is adapted to generate an output signal only by receiving a specific signal. As a specific signal to be applied to the signal detecting circuit 6, there may be employed a signal of a specific frequency or a specific level. The range of frequency or level is not critical but may be determined based upon the capacity of a telephone. Such a specific signal can be produced for example by a whistle or the like, or may be a voice of high level.

An answering tape $T_1$ on which an outgoing message is previously recorded may be of an endless type in the present embodiment. A magnetic reproducing head $H_1$ is provided for said answering tape $T_1$ and CP is a contact piece for detecting a conductive foil S attached to said tape $T_1$. $T_2$ is a message sending tape on which a message for a specified caller may be previously recorded. A magnetic reproducing head $H_2$ is associated with said message sending tape $T_2$. $T_3$ is an incoming message recording tape for recording a message from a caller. A magnetic recording head $H_3$ is provided for said incoming message recording tape $T_3$. In the present embodiment, one tape having two tracks is employed for the answering tape $T_1$ and the message sending tape $T_2$. Numeral 7 designates an amplifier for amplifying the output signals from the reproducing magnetic heads $H_1$ and $H_2$. An amplifier 8 is provided for amplifying a signal of an incoming message from a caller. $Y_3$ is a relay having three contacts $y_{31}$, $y_{32}$ and $y_{33}$ which are adapted to operate when the contact piece CP slidingly contacts the conductive foil S on the tape $T_1$. $Y_4$ is a relay having two contacts $y_{41}$ and $y_{42}$ which are adapted to operate by the output signal produced by the signal detecting circuit 6.

In FIG. 2, AC is a power source, $M_1$ a motor for driving both the answering tape $T_1$ and message sending tape $T_2$, and $M_2$ a motor for driving the incoming message recording tape $T_3$.

The relays in FIGS. 1 and 2 are shown in the standby state or normal state.

The operation will be explained hereinafter, referring also to FIG. 3. When a call signal or a bell signal comes into the terminal 1 of the telephone line (FIG. 3(a)), the signal is applied to the starting circuit 2 through the contact $y_{11}$ and coupling condensers $C_1$ and $C_2$. The starting circuit 2 generates an output after 3 to 10 seconds from the initial arrival of the call signal. The first timer circuit 3 then starts its operation according to said output and continues to operate and generate an output for a predetermined period of time. The total operation time of the present automatic telephone answering apparatus is determined by said first timer circuit 3.

Upon receiving the output signal from the first timer circuit 3, the relay $Y_1$ is energized (FIG. 3(b)) to switch its contacts $Y_{11}$, $y_{12}$ and $y_{13}$. The telephone line is then connected to the matching transformer 5 through the thus closed contact $y_{11}$ to form a telephone circuit, thereby bringing the apparatus into a condition ready for telephone conversation. According to the operation of the first timer circuit 3, the second timer circuit 4 is a actuated (FIG. 3(c)) by the output of the circuit 3 and operates the relay $Y_2$ after a short period of time, for example 2 or 3 seconds. Accordingly, if a signal is transmitted from a caller within 2 or 3 seconds after the contact $y_{11}$ of the relay $Y_1$ has been switched, said signal is detected by the signal detecting circuit 6 through the closed contact $y_{22}$. However, said signal detecting circuit 6 is adapted to produce an output only when the specific signal is applied to its input terminal, so that in case a signal from a caller is a normal voice signal, an output is not generated from said signal detecting circuit 6 and accordingly the relay $Y_4$ is not energized.

Meanwhile, as mentioned above, an output is produced from the second timer circuit 4 to actuate the relay $Y_2$ and switch its contacts $y_{21}$ and $y_{22}$ after a 2- or 3-second delay from activation of the first timer circuit 3. Accordingly, the contact $y_{22}$ is opened and a signal from the caller will not be applied thereafter to said signal detecting circuit 6. On the other hand, since the contact $y_{21}$ (FIG. 2) is closed, the motor $M_1$ associated with the answering tape $T_1$ and the message sending tape $T_2$ starts its driving. Upon the driving of said motor $M_1$, the answering tape $T_1$ and the message sending tape $T_2$, being one tape, simultaneously start running (FIG. 3(d) and FIG. 3(i)) to play back the answering message and the message to be conveyed to the specified caller, if any, with the magnetic heads $H_1$ and $H_2$, respectively. However, since the contact $y_{42}$ is now opened, only the outgoing message of the answering tape $T_1$ is amplified by the amplifier 7 through the contact $y_{41}$ and sent out to the caller through the contact $y_{31}$, the matching transformer 5 and the terminal 1 of the telephone line. The sending out of the answer message to the effect that the caller's message is to be recorded is usually finished with one revolution of the answering tape $T_1$. The contact piece CP is then short-circuited by the conductive foil S attached to said answering tape $T_1$ and the contact $y_{13}$ is grounded.

Figure 3:
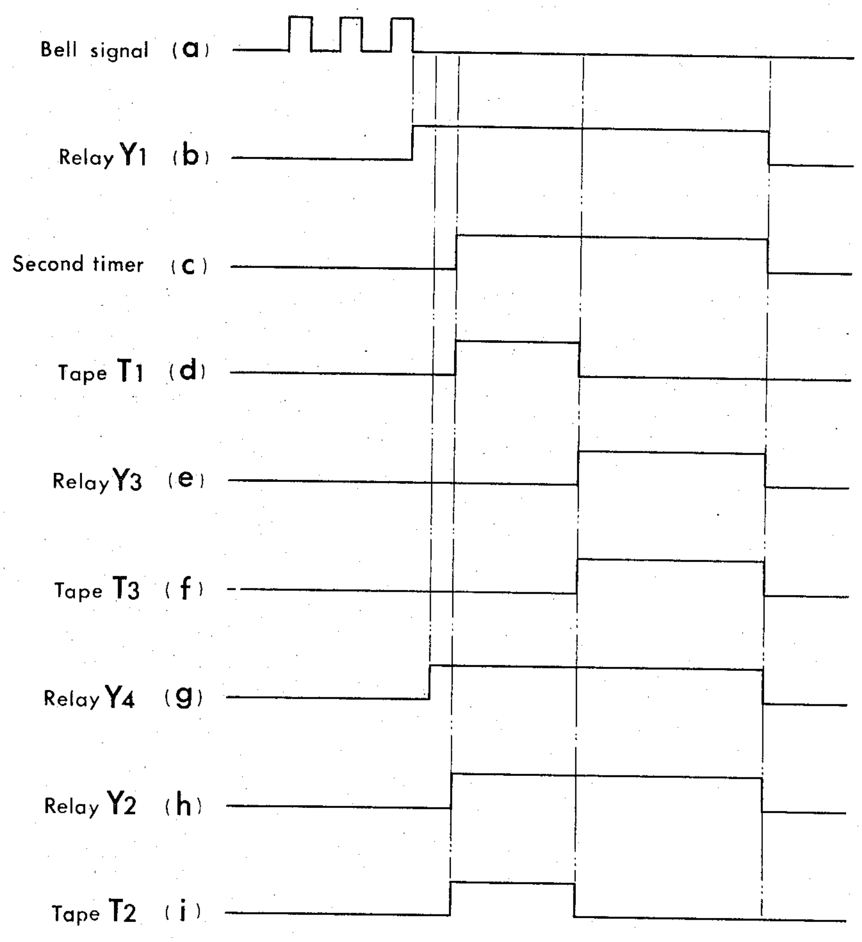
FIG. 3 is a time sequence diagram showing the relationship between time and operation of each of the circuits shown in FIGS. 1 and 2.

At this time, since said contact $y_{13}$ is closed, the relay $Y_3$ is energized (FIG. 3(*e*)) to switch the contacts $y_{31}$, $y_{32}$ and $y_{33}$. Due to the closing of th contact $y_{32}$, the relay $Y_3$ is self-maintained till the contact $y_{13}$ is opened, independently of the opening of the contact piece CP. On the other hand, upon the opening of the contact $y_{33}$, the motor $M_1$ is stopped to suspend the running of the answering tape $T_1$ and the message sending tape $T_2$. While, upon the closing of the contact $y_{32}$, the incoming message recording tape $T_3$ also starts running (FIG. 3(f)). Accordingly, if the caller transmits his message at this instant, the message signal is applied to the amplifier 8 through the matching transformer 5 and the contact $y_{31}$ and recorded on the incoming message recording tape $T_3$ through the magnetic recording head $H_3$.

After a predetermined period (for example, 30 to 60 seconds) determined by the first timer circuit 3 has passed, the relay $Y_1$ is de-energized to return contacts $y_{11}$, $y_{12}$ and $y_{13}$ to their original positions, respectively. Then the contact $y_{13}$ is opened and the relay $Y_3$ becomes deenergized, thereby to stop the motor $M_2$. The recording of the incoming message from the caller is thus completed. According to the opening of the contact $y_{11}$, the telephone circuit is opened and the apparatus is restored to the original standby condition for a further calling, thus completing a series of the answering and recording operation.

During the operation as mentioned above, if a specific signal is transmitted by a specified caller within 2 or 3 seconds after the first timer circuit 3 has been operated and before the second timer circuit 4 has started its operation, said specific signal is applied to, through the closed contact $y_{22}$, and detected by the signal detecting circuit 6, thereby to produce an output. The relay $Y_4$ is then actuated (FIG. 3(g)) by said output of the signal detecting circuit 6 due to the closed contact $y_{12}$ to switch the contacts $y_{41}$ and $y_{42}$. The magnetic head $H_2$ of the message sending tape $T_2$ is accordingly connected to the amplifier 7 through the contact $y_{42}$.

In this state, when the second timer circuit 4 is operated after 2 or 3 seconds after the first timer circuit 3 has been operated, the relay $Y_2$ is actuated (FIG. 3(h)) and its contacts $y_{21}$ and $y_{22}$ are switched to rotate the motor $M_1$. The answering tape $T_1$ and the message sending tape $T_2$ then start to run (FIG. 3(i)), but, since only the magnetic head $H_2$ is connected to the amplifier 7, only the message recorded on said message sending tape $T_2$ is sent out to the caller through a message sending circuit including the contact $y_{42}$, amplifier 7, contact $y_{31}$ and matching transformer 5. Accordingly, the caller can hear the message left for him. In the circuit as mentioned above, the signal detecting circuit 6 is adapted to be kept operative, once turned on, and continuously produce an output till the contact $y_{12}$ is opened.

The sending out of the message left for the specified caller is usually completed within one revolution of the answering tape $T_1$ and the message sending tape $T_2$. The contact piece CP is then short-circuited by the conductive foil S. Then, the relay $Y_3$ is actuated to stop the motor $M_1$ and drive the motor $M_2$ for running the incoming message recording tape $T_3$. Accordingly, a message from the caller, if any, can be recorded thereon. After the aforesaid predetermined period of the first timer circuit 3, the relay $Y_1$ becomes deactivated and the apparatus is restored to its standby condition.

Though in the foregoing embodiment of the present invention, a single tape having multiple tracks is commonly used for the message sending tape $T_2$ and the answering tape $T_1$, two tapes may of course be employed for the respective tapes. In this case, however, another motor will be required and is to be connected so as to be controlled by the contacts of the relay $Y_2$ or $Y_4$.

As apparent from the foregoing, in the present invention, necessary messages to be conveyed to a specified caller may be previously recorded on the message sending tape, which is adapted to run, only when the signal detecting circuit detects a specific signal from said caller within the specified time period, to send out the message for him, so that said specified caller can listen to the message left for him by telephoning to his home where no one is present or to his office after the closing hour, and a caller other than said specified caller can receive only conventional automatic telephone answering owing to the particular structure of the signal detecting circuit.

What is claimed is:

1. An automatic telephone answering apparatus comprising:
 starting circuit means adapted to start its operation by a call signal;
 first timer circuit means adapted to be actuated through said starting circuit means and determine the whole operating time of the apparatus;
 second timer circuit means adapted to operate at the conclusion of an initial delay time following the actuation of said first timer circuit;
 signal detecting circuit means adapted to operate when a specific signal is transmitted by a caller within the predetermined period after said first timer circuit has been operated and before the second timer circuit has started its operation;
 message sending circuit means having a message sending track actuable for sending out a special message to the specific signal transmitting caller;
 answering means having a further message sending track for sending out a standard answering message to callers not transmitting said specific signal;
 track switching means responsive to said signal detecting circuit means and comprising relay means having first and second alternately actuable contacts, one of said contacts being connected to said message sending circuit means for sending out the special message therefrom only when said signal detecting circuit means has been operated, and the other of said contacts being connected to said answering means for sending out said standard answering message upon receipt of a call not operating said signal detecting circuit means.

2. An automatic telephone answering apparatus as claimed in claim 1, wherein a single endless tape having two tracks is employed for said message sending track and for said answering track.

3. An automatic telephone answering apparatus as claimed in claim 1, wherein said specific signal to operate the signal detecting circuit is a signal of specific frequency.

4. An automatic telephone answering apparatus as claimed in claim 1, wherein said specific signal to operate the signal detecting circuit is a signal of specific magnitude.

5. In an automatic telephone answering apparatus having answering means for automatically answering a call by sending a prerecorded answering message to the caller and recording means for thereafter automatically recording information from the caller, the improvement comprising:
 preselected signal sensing means responsive to a preselected signal from the caller;
 first timer circuit means responsive to an incoming telephone call for defining a predetermined time interval and generating a first signal in response thereto for initially switching said incoming call to said signal sensing means;
 second timer circuit means responsive to said first signal and generating a second signal in response thereto a delayed interval of time later for switching said incoming telephone call from said preselected signal sensing means and for actuating said answering means, and circuit means normally connecting said incoming telephone call to said answering means and recording means after said initial switching, said delayed interval of time terminating substantially before the end of said predetermined time interval to enable operation of said answering means and recording means in the remainder of said predetermined time interval following said switching of said call from the signal sensing means.

6. The improvement according to claim 5, wherein said preselected signal sensing means is responsive to appearance of said preselected signal during said delayed interval of time for generating a third signal; and
 including message sending circuit means for sending a special prerecorded message to a caller who provides said preselected signal; and
 means responsive to said third signal for switching said incoming telephone call to said message sending circuit means in place of said answering means.

7. The improvement according to claim 6, wherein said answering means comprises a first tape track capable of playing back said prerecorded answering message and said message sending circuit means comprises a second tape track capable of playing back said special prerecorded message, said means responsive to said third signal comprising a relay having a first normally closed contact in circuit with said first tape track and a second normally open contact in circuit with said second tape track, said relay being responsive to said third signal for switching said contacts from their normal conditions, and including means for connecting the closed one of said contacts in communication with the caller.

8. The improvement according to claim 6, in which said answering means and message sending circuit means comprise first and second tape tracks respectively, and including common motor means responsive to said second signal for advancing said first and second tracks simultaneously and including means actuable after a further delayed interval of time following said first mentioned delayed interval of time, said further delayed interval being sufficient to enable completion of sending of the alternatively selected one of said answering message and special message, said further delayed interval terminating before the end of said predetermined time interval, for switching the caller from the alternatively selected one of said first and second tracks to said recording means.

9. The improvement according to claim 8, in which said recording means comprises a third tape track and second motor means for driving said third tape track, said common and second motor means being independently actuable respectively by said second timer circuit means and said means actuable after completion of said further interval of time.

10. The improvement according to claim 8 in which said first and second tracks comprise alternatively selectable tracks of a common endless loop tape and said third track comprises a track of a second and substantially longer tape, said predetermined time interval including in sequence said first mentioned delayed interval of time during which said preselected signal sensing means is connected to said caller, said further delayed interval of time during which the alternatively selected one of the answering means and message sending circuit means is connected to the caller and a third interval of time during which said recording means is connected to said caller, whereby during said further delayed interval a caller who has supplied said preselected signal is connected to said message sending circuit means but any alternative caller is connected to said answering means, callers of both types thereafter being connectable to said recording means to leave an incoming message, incoming messages on said recording means being inaccessible to all callers.

* * * * *